Aug. 10, 1943.  F. E. PAYNE  2,326,489
LIQUID SEAL
Filed Feb. 20, 1941
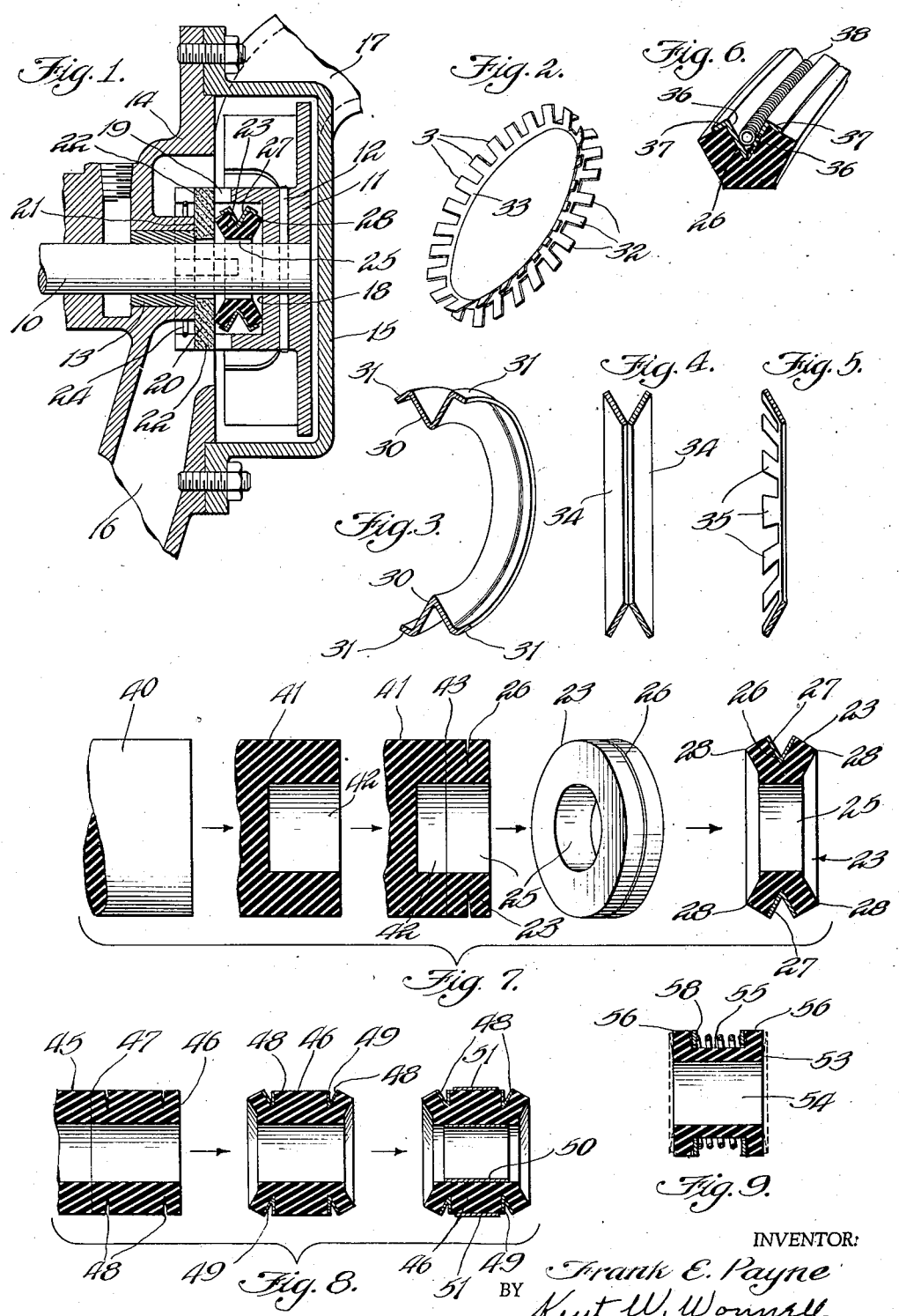
INVENTOR:
Frank E. Payne
BY Kent W. Wonnell
ATTY.

Patented Aug. 10, 1943

2,326,489

UNITED STATES PATENT OFFICE 2,326,489

LIQUID SEAL

Frank E. Payne, Barrington, Ill., assignor to Crane Packing Company, Chicago, Ill., a corporation of Illinois Application February 20, 1941, Serial No. 379,790

1 Claim. (Cl. 288—2)

This invention relates in general to a packing or seal between two plane and approximately parallel surfaces and is more particularly described in such connection as a seal for a fluid pump such as a water pump of an internal combustion engine.

An important object of the invention is in the provision of a flexible, resilient sealing member formed of rubber or a rubber-like material or substitute, adapted to be flexed, and maintaining its elasticity although subjected to heat, pressure and various fluids and still maintaining a fluid tight seal with the surfaces engaged thereby to permit relative longitudinal movement between the surfaces without disrupting the seal.

A further object of the invention is in the provision of a packing or seal adapted to be expanded or spread by a resilient insert which deflects the contacting portions of the seal out of the plane of the remainder thereof to provide an engaging sealing surface.

A still further object of the invention is in the method of making a seal of a continuous bar length or cylinder of elastic flexible material by progressively shaping, cutting and removing an exposed end thereof.

A still further object of the invention is in the provision of a sealing member adapted to be expanded or spread by means of a resilient insert set into a groove or recess of the sealing material for extending an edge contacting portion thereof out of the normal plane of the end surface.

Other and further objects of the invention will appear in the specification and will be apparent from the accompanying drawing in which, Fig. 1 is a sectional view illustrating a seal in accordance with this invention as applied to the impeller of a rotary pump;

Figs. 2, 3, 4 and 5 each illustrate a different form of spring insert or spreader as contemplated by this invention;

Fig. 6 is a sectional detail illustrating a still further spreader modification as applied to a portion of a seal;

Fig. 7 is a flow diagram illustrating the method of making a liquid seal from a piece of bar stock, and the application of a spreader to the finished seal member;

Fig. 8 is a flow diagram illustrating the making of a seal or a tubular or hose section and applying spaced spreaders thereto; and Fig. 9 is a sectional view illustrating a modification of the seal member.

In some fluid seals for rotary shafts, the flexible resilient sealing member must make a fluid tight connection with a shaft to which it is applied, the shaft having considerable play or longitudinal movement relative to its bearing and the bearing being engaged by a frictional disk or washer which makes a fluid tight joint therewith. In the present invention, the sealing member has opposite bearing edges or surfaces adapted to be spread or extended outwardly to make a fluid tight engagement between parallel surfaces, one of which may be the outer face of a washer and the other of which an inner surface in a pocket or recess substantially parallel with the contact face of the washer. Thus no contact with the shaft by the sealing member is necessary, the sealing member usually surrounding, but being free from engagement with the shaft.

Referring now more particularly to the drawing, this invention is described as a seal for a pump as commonly used for circulating the cooling water of an automobile. It comprises a shaft 10 having a pump impeller 11 secured thereto by a key or pin 12 and rotatable in a bearing 13 of casing 14 having a removable and closing cap 15. Water or the liquid is admitted through an inlet 16 and discharged by the impeller through an outlet 17.

In order to maintain a fluid tight connection for the shaft, the impeller is provided with a hub recess 18 surrounding the shaft somewhat in the form of a cup having slots 19 in the open edge which freely overlap and surround the bearing 13. Engaging the end of the bearing is a washer or disk 20 formed of carbon, Bakelite or other suitable material, adapted to make a liquid tight joint 21 at the end of the shaft bearing and having outer projections 22 engaged in the slots 19 of the impeller cup so that the disk rotates therewith making the joint 21 fluid tight.

The disk 20 is held in fluid tight engagement by a flexible resilient seal 23 seated in the recess 18 and engaging the outer face of the disk at one side, and the bottom of the recess substantially parallel thereto at the other side. Near the outer end of the cup at the inside thereof is a spring retaining ring 24 seated in a groove and adapted to hold the disk and the sealing member against dislodgement from the cup when the impeller and shaft are removed or applied to the casing, but ordinarily disposed so that the disk does not come into engagement therewith.

The sealing member comprises a cylindrical member, a round, thick washer-like member of rubber or rubber-like material which is flexible and resilient even under considerable heat and pressure and does not change materially in size when subjected to different liquids. It has an inner hole or perforation 25 slightly larger than the shaft or other member to which it is applied to fit freely thereon, and in the outer peripheral edge is a cut or slot 26 extending part way into the wall thereof, but not extending through to the inner opening thereof at any place. Into this slot 26 is inserted a resilient expander or spreader 27 which tends to deflect the split portions of the member outwardly so that the edges or extremities 28 thereof project materially beyond the normal side faces engaging the outer face of the disk 20 and the bottom of the recess 18, when applied to a pump, or other opposite parallel surface for similar installations.

The spreader is resilient and elastic, usually made of spring material such as light sheet metal and may be formed in the shape of a trough 30 with outer flanges 31 as shown in Fig. 3; spring tongues 32 may extend outwardly angularly in opposite directions from a central connecting rim 33 as shown in Fig. 2; two inclined disks 34 as shown in Fig. 4 may be placed with other smaller edges together in the slit or groove of the seal member; the disks may have a plurality of spring tongues 35 as shown by Fig. 5; or a pair of disks 36 with outer rims 37 may be seated oppositely in the slit 26 as shown in Fig. 6 with a coil spring 38 seated in the angle between the disks and tending to press them and the divided extremities of the sealing member apart. In all of these forms, the spring ring or expander tends to project the edges of the sealing member and to hold it resiliently against contacting movement. For any pump or other installation, the sealing member with the expander therein is seated under sufficient compression to take up end play or relative longitudinal movement between the shaft and a bearing in which it is rotatable without disturbing the contact of the sealing surfaces.

The sealing member may be made from a block or length of material 40 as represented in Fig. 7 which is turned to size 41 as in a lathe or screw machine with a central opening 42. In the outer periphery, a slit or slot 26 is cut which terminates short of the inner opening 42, and a washer 23 of a desired thickness is severed from the remainder of the block or stock by a cut 43, thus forming a washer or resilient seal 23 of the desired size and shape and having a central opening 25 of the desired diameter.

Instead of cutting seal members from a solid piece of bar stock, they may also be cut in a similar manner from a cylindrical or hollow bar or may be cut from a hose-like piece 45 as indicated in Fig. 8. Instead of having a single slot at the outside of each member, sealing members 46 may be severed on the line 47 from a continuous piece with slots 48 in the periphery thereof near the ends into which spreaders 49 may be inserted. For a somewhat thick sealing member of this type, that is having considerable length along the axis, an inner holding ring 50 and an outer holding ring 51 may be applied closely to the inner and outer peripheries of the sealing member to prevent it from swelling when the spreaders are inserted.

As a further form of the invention, a sealing member 53 of the wider type having a central bore 54 may be formed with an outer recess 55, formed between flanges 56. To incline these flanges outwardly to form opposite sealing edges, a coil spring 57 may be partially compressed in the recesses between end plates 58.

In all of these forms, the sealing member is of sufficient elasticity and resilience that it may be formed and compressed within the spreaders or rings which are seated in the slots or recesses, the sealing edges being then flexibly extended by the resilient spreader.

While I have thus shown sealing members of different forms made in a variety of ways, and a number of different resilient spreaders therefor, it is obvious that various other changes may be made without departing from the spirit and scope of the invention.

I claim:

A fluid seal of flexible resilient material comprising a sleeve having a central opening and means to free the outer periphery near the ends to provide angular outer peripheral edges extensible beyond the normal planes of the ends, resilient spreaders insertable in the means to project the said angular edges, and inner and outer confining shells to engage the sleeve to prevent it from bulging and buckling.

FRANK E. PAYNE.